(12) United States Patent
Kejha

(10) Patent No.: US 7,036,616 B1
(45) Date of Patent: May 2, 2006

(54) HYDROGEN-ELECTRIC HYBRID VEHICLE CONSTRUCTION

(75) Inventor: Joseph B. Kejha, Meadowbrook, PA (US)

(73) Assignee: Electrion, Inc., Meadowbrook, PA (US)

( * ) Notice: Subject to any disclaimer, the term of this patent is extended or adjusted under 35 U.S.C. 154(b) by 0 days.

(21) Appl. No.: 09/350,713

(22) Filed: Jul. 9, 1999

Related U.S. Application Data

(63) Continuation-in-part of application No. 08/950,445, filed on Oct. 15, 1997, which is a continuation-in-part of application No. 08/373,090, filed on Jan. 17, 1995, now abandoned.

(51) Int. Cl.
*B60K 6/00* (2006.01)

(52) U.S. Cl. .................... 180/65.3; 180/65.4; 903/908; 903/925

(58) Field of Classification Search .............. 130/65.1, 130/65.3, 65.4, 65.6, 218, 220; 123/1 A, 123/DIG. 12; 48/61; 429/105, 17; 420/83
See application file for complete search history.

(56) References Cited

U.S. PATENT DOCUMENTS

| | | | |
|---|---|---|---|
| 1,567,169 A | 12/1925 | Patterson | |
| 2,647,012 A | 7/1953 | Walker | |
| 2,757,018 A | 7/1956 | Galla | |
| 3,391,752 A | 7/1968 | Albright | |
| 3,517,766 A | * 6/1970 | West | .................... 180/65.4 |
| 3,617,364 A | 11/1971 | Jarema | |
| 3,895,102 A | * 7/1975 | Gallagher | ................... 423/657 |
| 4,031,865 A | 6/1977 | Dufour | |
| 4,085,709 A | * 4/1978 | Tangri | ........................ 123/1 A |
| 4,112,875 A | * 9/1978 | Laumann et al. | ........... 123/1 A |
| 4,124,741 A | * 11/1978 | Hart | ........................... 429/105 |
| 4,148,505 A | 4/1979 | Jensen et al. | |
| 4,226,213 A | * 10/1980 | Bernauer | ..................... 123/1 A |
| 4,985,184 A | * 1/1991 | Takahashi et al. | ............. 264/6 |
| 5,143,025 A | * 9/1992 | Munday | .............. 123/DIG. 12 |
| 5,293,857 A | * 3/1994 | Meyer | ................. 123/DIG. 12 |

(Continued)

FOREIGN PATENT DOCUMENTS

| | | |
|---|---|---|
| GB | 2254055 | 9/1992 |
| JP | 6156316 | 6/1994 |

OTHER PUBLICATIONS

Article "Impact Finds Believers" by Charles J. Murray, Design News Magazine, Published Oct. 1, 1990, p. 126 to 129.

(Continued)

*Primary Examiner*—Frank Vanaman

(57) ABSTRACT

An electric vehicle which carries at least two passengers, which has at least three wheels, said passengers sitting in tandem and most of the batteries or fuel cell systems are located on the sides of the passengers. The vehicle has an aerodynamically shaped body with substantially reduced frontal area and drag. The body is lightweight, made from shock absorbing materials and structures, and has pressure-airless tires, which enhances the safety of the passengers. The vehicle also includes an advanced hydrogen-electric hybrid propulsion system with quick refueling from existing infrastructure and various additional optional features and systems.

10 Claims, 11 Drawing Sheets

U.S. PATENT DOCUMENTS 5,338,080 A      8/1994   Janotik et al.
5,360,461 A * 11/1994   Meinzer .............. 123/DIG. 12
5,372,617 A * 12/1994   Kerrebrock et al. ........... 48/61
5,462,021 A * 10/1995   Minami et al. ...... 123/DIG. 12
5,690,889 A * 11/1997   McCallum et al. ........... 420/83
5,840,270 A * 11/1998   Werth .......................... 429/17
5,991,670 A * 11/1999   Mufford et al. ............ 180/65.1

OTHER PUBLICATIONS

Article "A Hybrid Electric Family Sedan Goes the Distance" Motor Trend Magazine by Ron Cogan, Apr. 1993, p. 62 & 63.

Pages 42-8 to 42-10 from the "Handbook of Batteries and Fuel Cells" by David Linden, McGraw-Hill Inc., 1984.

* cited by examiner

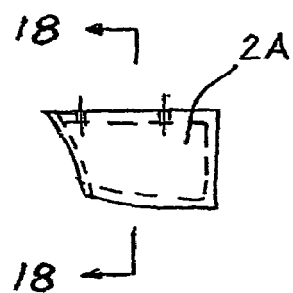
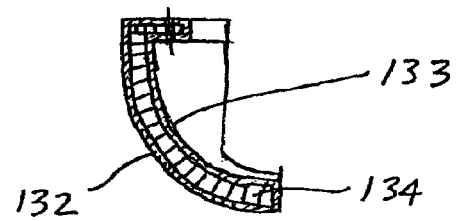
FIG. 17　　　　　　　FIG. 18
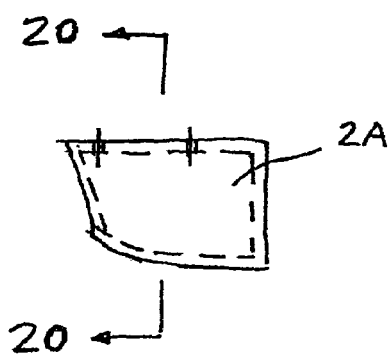
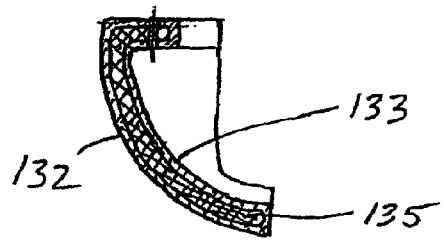
FIG. 19　　　　　　　FIG. 20

HYDROGEN-ELECTRIC HYBRID VEHICLE CONSTRUCTION

CROSS REFERENCE TO RELATED DOCUMENTS

This application is continuation in part of a prior co-pending patent application of Joseph B. Kejha, Ser. No. 08/950,445 filed Oct. 15, 1997, entitled "LONG RANGE AND ULTRALIGHT ELECTRIC VEHICLE", which is continuation in part of a prior patent application of Joseph B. Kejha, Ser. No. 08/373,090, filed Jan. 17, 1995, entitled "LONG RANGE AND SAFER ELECTRIC VEHICLE CONSTRUCTION" now abandoned, and which is related to a prior Disclosure Document of Joseph B. Kejha, Ser. No. 322,973, filed Jan. 12, 1993, entitled "LONG RANGE AND SAFER ELECTRIC VEHICLE CONSTRUCTION", which is related to a prior Disclosure Document of Joseph B. Kejha, Ser. No. 298,996, filed Jan. 27, 1992, entitled "LOW DRAG, LIGHTWEIGHT AND SAFER-ELECTRIC VEHICLE CONSTRUCTION". This application is also related to a prior Disclosure Document of Joseph B. Kejha, Ser. No. 452,940 filed Mar. 15, 1999, entitled "LIGHTWEIGHT AND HIGH RATE ELECTROLYZER WITH LIGHTWEIGHT AND HIGH RATE HYDROGEN STORAGE" and to a prior Disclosure Document of Joseph B. Kejha, Ser. No. 434,242 filed Apr. 13, 1998, entitled "HYDROGEN-ELECTRIC HYBRID SYSTEM WITH SAFE FUEL STORAGE AND QUICK REFUELING FEATURE."

BACKGROUND OF THE INVENTION

1. Field of the Invention

This invention pertains to a long range steerable electric vehicle of the type which has at least three wheels, an aero-dynamically shaped body with substantially reduced frontal area, constructed of lightweight, impact resistant and energy absorbing materials and which has enhanced the safety of driving by configuration of its components and by sheltered location of the passengers, as well as by selection of the structures, materials and tires.

Said vehicle has also highly advanced propulsion systems, an optional non-polluting and economical power back-up system and other optional equipment.

2. Brief Description of the Prior Art

Prior art electric automobiles for two or more passengers are of similar construction as internal combustion engine automobiles; that is to say that the driver and one passenger were seated side by side, and the automobiles had three or four wheels in open sockets or recesses, due to the requirement that the wheels protrude from the contour of the body during steering, the need to minimize the width of the vehicle, and also due to access for wheel replacement and service.

However, this structure contributes to high aerodynamic drag and resultant higher energy consumption, especially at speeds above 35 miles per hour.

The need for lower drag and less electric energy consumption and thus increased range, have been addressed so far only by improving the aerodynamic shape of the vehicle by streamlining and smoothing the vehicle body, reclining the windshield, lowering the vehicle height, and to a smaller degree, reducing the weight.

The battery packs for electric vehicles have usually been located in the front or back of the vehicle, which unfavorably affects the center of gravity and vehicle handling, or in some instances, the battery packs have been mounted on the centerline of the vehicle in a tunnel.

The center tunnel construction further contributes to increased body width, placing the passengers further apart and thus increasing the frontal area, aerodynamic drag, weight and energy consumption. The center tunnel construction also makes servicing of the batteries more difficult, due to their limited access.

GB Patent #2,254,055 of Bothwell discloses a four wheeled vehicle with tandem seating of the two passengers, but does not teach location of batteries or fuel cells in lower side compartments, lengthwise between the wheels, outside of the passenger compartment.

U.S. Pat. No. 2,647,012 of Walker discloses a small removable starter battery from a lower side compartment, but located behind the rear wheel of an internal combustion engine vehicle. Large electric vehicle batteries in this location would adversely impact center of gravity and steering of the vehicle.

U.S. Pat. No. 3,391,752 of Albright teaches an electric vehicle construction having batteries as structural members, including high side batteries. Electric vehicle of the invention does not use batteries as structural members and has low level batteries removable from low level side tunnels.

JP-6-156316 patent of Suzuki teaches an electric automobile having tandem seating of the passengers, but clearly shows less aerodynamic vehicle with location of batteries under the rear seat—(not on sides), which results in larger (higher) frontal area, increased drag, reduced safety of the driver during frontal impact and an unstable vehicle with the center of gravity close to the rear wheels.

None of the above patents discloses or suggests a selective combination of these references, nor suggests the vehicle as described in this patent.

U.S. Pat. No. 1,567,169 of Patterson teaches a very narrow and tall rear view mirror recessed inside of the front part of the window frame of the vehicle door. Patterson does not teach anything about streamlining of the mirrors and air drag reduction, and provides very limited rear view angle due to the narrowness of his mirror, and the rear part of the window frame is obstructing the view directly rearward. This patent's wide and low recessed mirrors in the sides of the vehicle of the invention and on the outside of the windows have no such obstruction due to the step down in the upper sides of the vehicle of the invention, at the base of the side windows, and provide wide angle and better views rearward, even through the side windows.

U.S. Pat. No. 2,757,018 of Galla teaches a hinged fender skirt covering the rear wheel, but does not teach top hinged panels covering the front wheels. The front wheels of Galla's conventional vehicle protrude from the body during steering and thus would interfere with the front panels.

U.S. Pat. No. 4,148,505 of Jensen discloses a honeycomb structure, but not in the sides of the vehicle. Jensen uses honeycomb only as a secondary, "stage 2" layer, and only in combination with cellular foam of "stage 1" layer in the front end of the vehicle. Structures in this patent use the honeycomb alone as a primary filler. It would not be obvious to use honeycomb in the sides of the vehicle, because Jensen's vehicle does not provide for thick sides because it does not have low side batteries and tandem seating of the passengers. There is no reason to add thickness of Jensen's vehicle side, since it would only increase the air drag and weight.

The vehicle body frame, or cage, was usually made from steel or aluminum of various sections, welded together, and with the body panels attached to the frame. The vehicle may also have a self-supporting body shell made of stamped steel or aluminum sheet metal, or made of a fiber and resin composite material. The fibers used have been glass, carbon, aramid and other polymers. Vehicle construction which uses steel, or glass fibers produces a body which is relatively heavy for use in an advanced electric vehicle. While aluminum metal is lightweight, it is not the most lightweight structural metal. Carbon fibers are brittle and dangerous in a crash, as they have low impact resistance, and aramid fibers are not the most lightweight fibers.

Magnesium is known to be used in automotive application and consumer products only in small components or secondary structures like casted covers, brackets, or computer casings. Spacecraft structures sometimes use welded magnesium extrusions, which are expensive due to requirement of special inert atmosphere for welding, the need for complex welding fixtures and heat treatment after welding to relieve stress in the structure.

U.S. Pat. No. 5,338,080 of Janotik et al. discloses a vehicle body frame formed from welded extrusions joined together with aid of open U-shaped channels and an adhesive, at their length. Janotik does not use fittings. The fitting is the structural element for joining the ends of the tubes, pipes or similar parts together, approximately at their intersection points in a plane or three dimensional space. The ends of tubes are slide-inserted into, or over the fittings with an adhesive, or are press-fitted, or are threaded. Janotik's sleeve (90) is an open U-shaped channel, only covering the tube member (66) and it is also crimped to the rocker (72). It is not a fitting as described and claimed in this patent. Janotik also does not teach a vehicle body frame made of magnesium alloy, and uses an adhesive in combination with crimping to join together only frame subassemblies, not all individual elements.

U.S. Pat. No. 3,617,364 of Jarema discloses a plastic layer on a foam core, but does not teach composite sandwich construction of body panel with a metal foam core. Composite sandwich is a core having composite skins on both sides (surfaces). Jarema discloses only one plastic layer coated on one side and furthermore it is not a composite layer, such as fibers embedded in a resin matrix.

The prior art electrical vehicles often have high pressure air filled tires, which can blow out and cause accidents.

Since the electric motors used in prior art vehicles do not generate appreciable quantities of heat and because the use of electricity for heating and cooling of the vehicle passenger compartment may be impractical due to the high energy drain on the batteries, prior art electric vehicles use auxiliary gasoline, diesel or kerosene fueled heating/cooling systems, but these systems continue pollution of the atmosphere and defeat the non-pollution purpose of electric vehicles.

In addition, prior art electric vehicles have very limited ranges, not only because of their body weight and high drag, but also because they utilize low specific energy density batteries.

Hybrid electric vehicle construction has been proposed, but the non-electric portion is not free from atmospheric pollution.

An engine which only reduces the atmospheric pollution and extends the range is proposed in U.S. Pat. No. 4,031,865 of Dufour which discloses a hydrogen generating cell used only as a supplement to a conventional gas fuel, such as gasoline, to improve the efficiency of the engine. Dufour does not teach non-polluting, hydrogen generating system which is consuming only water, or only water and hydrogen.

U.S. Pat. No. 4,112,875 of Laumann et al. discloses a hydrogen-oxygen fueled, closed cycle internal combustion engine system in combination with solar cells, and which uses a pressurized noble gas, such as argon, as a working fluid, and which stores hydrogen and oxygen gases in storage devices under high pressure, which is very dangerous, heavy and space demanding. Such system would be also too heavy and bulky, thus limiting the range and would be difficult to seal in a vehicle. Laumann does not include or suggest combination with batteries, electric motors or a vehicle.

"Handbook of Batteries and Fuel Cells" by David Linden, McGraw Hill Inc., 1984, page 42–8 discloses a hydrogen production on demand only in a Kipp chemical reactor by contacting a metal hydride powder with water, under controlled conditions. However, all prior art reactor systems produce a waste material which must be disposed of, and are dangerous to handle due to highly flammable hydrides when exposed to moisture or moist air. There is also virtually no infrastructure available for these metal hydrides.

The low drag, lightweight, highly energized, safer, non-polluting and long range electric vehicle construction of the invention does not suffer from prior art problems and provides many positive advantages.

SUMMARY OF THE INVENTION

It has now been found that low drag, lightweight, highly energized and safer electric vehicles, of at least three wheels, for at least two passengers can be made by seating the driver and the passenger (or passengers) in a tandem configuration, one behind the other, approximately on the imaginary longitudinal center-line of symmetry-line of the vehicle, which permits narrowing the width of the wheel base and thus it makes possible to cover the wheels with removable or hinged side panels, while maintaining the original three or four wheeled vehicle body width (as with side by side seating), and which also permits decreasing the frontal area of the windshield by 50% (percent), and the frontal area of the vehicle by approximately 25% (percent). Smoothing the sides of the vehicle by said panels and maintaining a streamlined body shape the aerodynamic drag is substantially reduced; in addition, locating two battery packs in rows on both sides of the passengers and one battery pack in the front of the vehicle increases the safety of the passengers by protecting them with the batteries' mass. Lowering the total weight of the vehicle and further safety improvements can be achieved by using magnesium metal for the vehicle body frame, and/or cage construction, by using ultra-high molecular weight polyethylene fibers with a polyester or vinylester resin, and preferably a fire retardant paper or metal such as aluminum honeycomb, or foam for the body panel construction, and by using lightweight, pressure-airless tires.

It has also been found that the range of the electric vehicle can be extended by using an additional, internal combustion based propulsion and electricity generating system, such as engine/generator, which is fueled by non-polluting hydrogen, preferably produced on demand only, for safety, by the electrolysis of water and/or by other means carried in the vehicle, and that the hydrogen component as fuel can be used also for the vehicle heating, cooling system and for recharging the batteries; and that the hydrogen fuel can be replenished also by an on-board electrolyzer refilled with water and connected to an outside electric power source anywhere, and that said hydrogen may be stored in a low pressure tank filled with a metal hydride or a lightweight carbon, such as graphite.

In addition, at least one, or all of the vehicle batteries, and/or the engine/generator may be replaced or supplemented by a fuel cell system.

The principal object of the invention is to provide a safer hydrogen-electric hybrid vehicle construction which can carry at least one passenger, which has at least three wheels, which has a low aerodynamic drag, is lightweight and has a low energy consumption and long range.

A further object of the invention is to provide electric vehicle construction which has a longer operating range than prior art electric vehicles, due to its highly advanced, non-polluting propulsion systems.

A further object of the invention is to provide non-polluting electric hybrid vehicle construction, which can be refueled anywhere from the existing infrastructure.

A further object of the invention is to provide electric vehicle construction, which is easy and economical to manufacture.

A further object of the invention is to provide electric vehicle construction, which has improved vehicle maneuvering and steering.

A further object of the invention is to provide electric vehicle construction, which has a quiet ride.

A further object of the invention is to provide electric vehicle construction which is environmentally friendly and constructed of recyclable materials.

Other object and advantageous features of the invention will be apparent from the description and claims.

BRIEF DESCRIPTION OF THE DRAWINGS

The nature and characteristic features of the invention will be more readily understood from the following description taken in connection with the accompanying drawing forming part hereof in which:

FIG. 17 is a top elevational view of a body panel having a honeycomb core composite sandwich construction;

FIG. 18 is a vertical sectional view of a body panel taken approximately on the line 18—18 of FIG. 17;

FIG. 19 is a top elevational view of a body panel having a foam core composite sandwich construction;

FIG. 20 is a vertical sectional view of a body panel taken approximately on the line 20—20 of FIG. 19;

Like numerals refer to like parts throughout the several views and figures.

Figure 1:
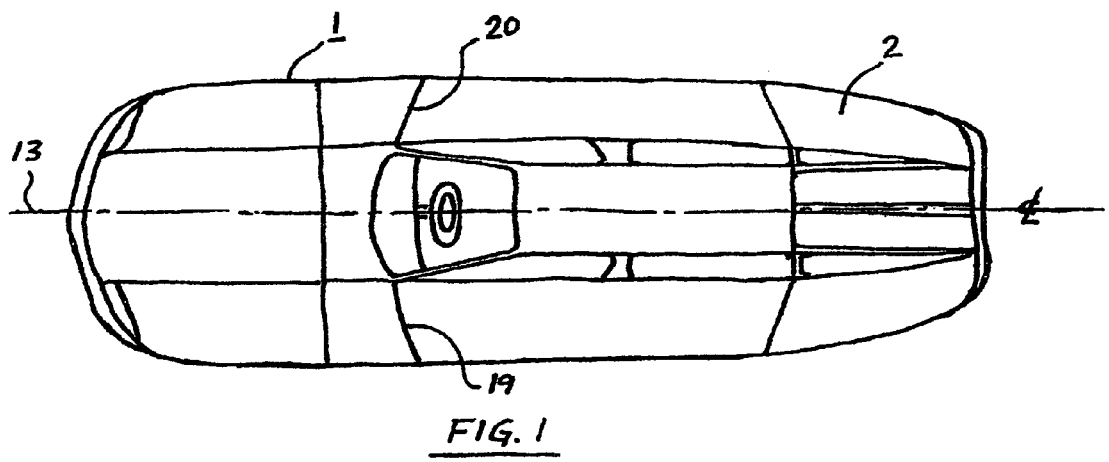
FIG. 1 is a top plan view of one embodiment of the electric vehicle of the invention.
Figure 2:
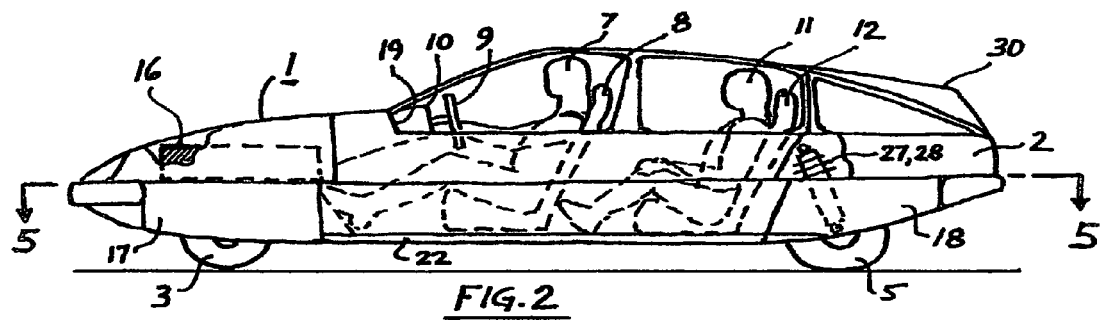
FIG. 2 is a side view partially broken away of the electric vehicle of the invention.
Figure 3:
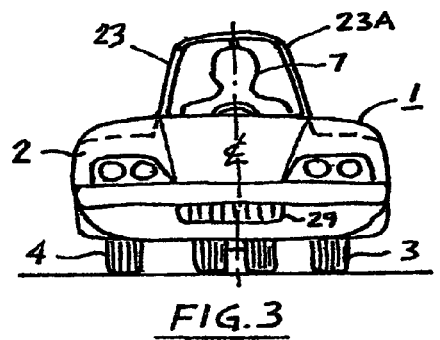
FIG. 3 is a front elevational view of the electric vehicle of the invention.
Figure 4:
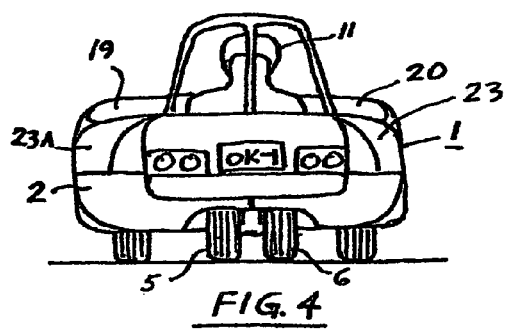
FIG. 4 is a rear view of the electric vehicle of the invention.

It should, of course, be understood that the description and the drawings herein are merely illustrative, and it will be apparent that various modifications, combinations and changes can be made of the structures and the systems disclosed without departing from the spirit of the invention and from the scope of the appended claims.

DESCRIPTION OF THE PREFERRED EMBODIMENTS

When referring to the preferred embodiments certain terminology will be utilized for the sake of clarity. Use of such terminology is intended to encompass not only the described embodiment, but also all technical equivalents which operate and function in substantially the same way to bring about the same results.

The electric vehicle and for example two passenger electric vehicle comprises, a body which is riding on three, four or more wheels with a steering and braking system, two seats, and at least one electric motor with a controller and a transmission or a reduction gear box connected to the wheels through the drive axles, at least one battery pack to store the electric energy, an instrumentation package and various lights.

The optional equipment may consist of an electric charger or a solar cell charger for the batteries, a heating and cooling system of the passenger enclosure, a cooling system of the electric motor and batteries, an air bag, various electronic packages and at least one auxiliary combustion engine.

The body may consist of a frame with the body panels attached to it, or may consist of a sheet metal or a composite self-supporting shell.

The preferred electric vehicle construction of the invention was generally described in my prior Disclosure Documents Ser. No. 298,996, Ser. No. 322,973, Ser. No. 434,242, and Ser. No. 452,940.

Referring now in more detail, particularly to the drawings of this patent and FIGS. 1–5 inclusive, and FIGS. 16–20 inclusive, one embodiment of the electric vehicle of the invention 1 has a body 2 with two front driven and steered wheels 3 and 4 and two rear wheels 5 and 6. The driver 7 sits in the front seat 8 and has access to the steering controls 9 and the instrumentation 10 of the vehicle. The passenger 11 sits in the rear seat 12 behind driver 7. The driver 7 and the passenger 11 will be further referred to, as "passengers" unless it is necessary to distinguish their functions. Both passengers are located approximately on the imaginary longitudinal center line or line of symmetry 13 of the vehicle 1, and two battery packs 14 and 15 are located on both sides of the passengers 7 and 11 and on the lowest floor level, and with the lowest profile possible. An additional battery pack 16 may be located in the front of said passengers, to increase driving wheels adhesion and power transfer to the front driven wheels 3 and 4.

The side battery pack 14, side battery pack 15, and the front battery pack 16 increase the safety of the passengers 7 and 11 by protecting them by their mass and help to shift the center of gravity of the vehicle closer to the middle. In addition, the locations of the battery packs make them more easily serviceable.

In case of frontal impact to the vehicle, the batteries 14 and 15 on the sides of the passengers 7 and 11 hit the front wheels 3 and 4 and their kinetic energy will be absorbed by the wheels, serving as a buffer, and they will not impinge on the passengers.

The tandem seating of the passengers as described above, makes it possible to reduce the frontal area of the vehicle up to 25% (percent) approximately as compared to conventional side by side seating, and it also permits narrowing of the wheel base, which permits further reduction of the aerodynamic drag by covering the wheels, including the front ones, with removable or top hinged side panels 17 and 18 and thereby smoothing the sides of the vehicle.

Additional aerodynamic drag reduction may be achieved by streamlining and recessing the side mounted rear view mirrors 19 and 20 into the front and sides of the vehicle as shown.

It is obvious to a person skilled in the art, that the described location and streamlining of the rear-view mirrors is useable also in many other electric vehicles with tandem seating of the passengers.

The overall aerodynamic shape of the vehicle body 2 is streamlined and shaped into a form similar to a droplet shape and is encompassing the passengers, the wheels, the batteries, and other components in all views as close as is practically possible.

Figure 16:
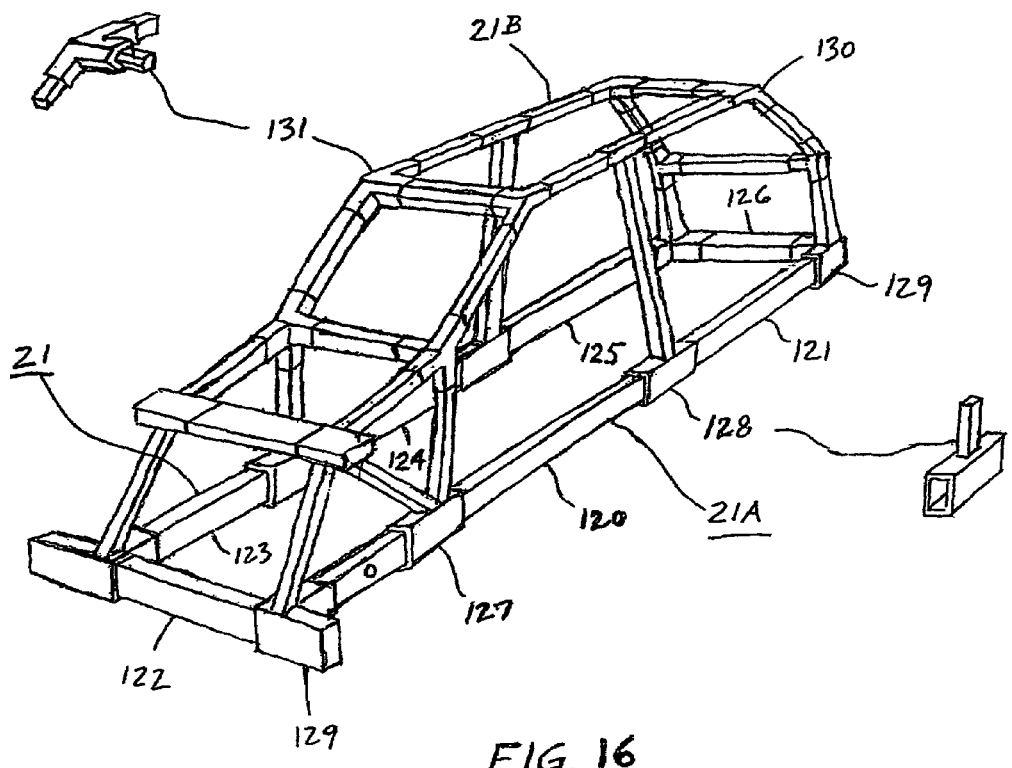
FIG. 16 is an axionometric view of an electric vehicle frame formed of bonded extrusions and fittings.

The performance of the vehicle is also enhanced by reducing the body weight. The body weight reduction may be achieved by using a virtually all magnesium metal body frame 21, which may be constructed from extruded magnesium metal alloy tubings, such as tubes 120 to 126 inclusive, preferably having square or rectangular sections, bonded together with an adhesive and the aid of various (preferably magnesium) metal joint fittings, such as fittings 127 to 131 inclusive, as shown in FIG. 16, and which is another embodiment of the invention.

The fittings are understood to be structural elements for joining ends of tubes at their intersection points by sliding into or over the tubes, or may be threaded.

The body frame 21 includes the chassis 21A at the base of the vehicle, and a roll cage 21B which helps to support the roof of the vehicle. This adhesively joined magnesium frame is easy to assemble and less costly than welded magnesium frame, which requires expensive welding fixtures and heat treatment after welding to remove stress. Cost of the magnesium per specific strength is about the same as the cost of aluminum, but the magnesium frame is much lighter.

It is apparent to a person skilled in the art, that said body frame construction, as described, is useable also in many other electric vehicles.

A further weight reduction may be achieved by using the ultrahigh molecular weight polyethylene fibers with a polyester or vinylester resin in a composite 132 or in a composite sandwich construction 133 with a paper, and preferably a fire retardant paper or aluminum honeycomb core 134, or a foam core 135, for at least one body panel structure of the body 2, such as panel 2A, which is attached to the frame 21, as is shown in FIGS. 17 to 20 inclusive, and which are another embodiments of the invention.

It is apparent to a person skilled in the art, that all the above weight and drag reductions contribute to a longer range of said vehicle, as compared to other prior art vehicles even when having an identical prior art propulsion system, equipment and payload.

The inherent safety feature built into the vehicle is the location of the batteries on the sides and in the front of the passengers and the use of the selected materials and construction as described. Both materials, the magnesium and the ultrahigh molecular weight polyethylene fibers with the honeycomb core sandwich composite construction have the highest energy absorption and vibration damping characteristics of all known materials. This unique combination also contributes to a quiet ride of the vehicle. The fire retardant paper honeycomb may be also made from a recycled paper economically.

Figure 23:
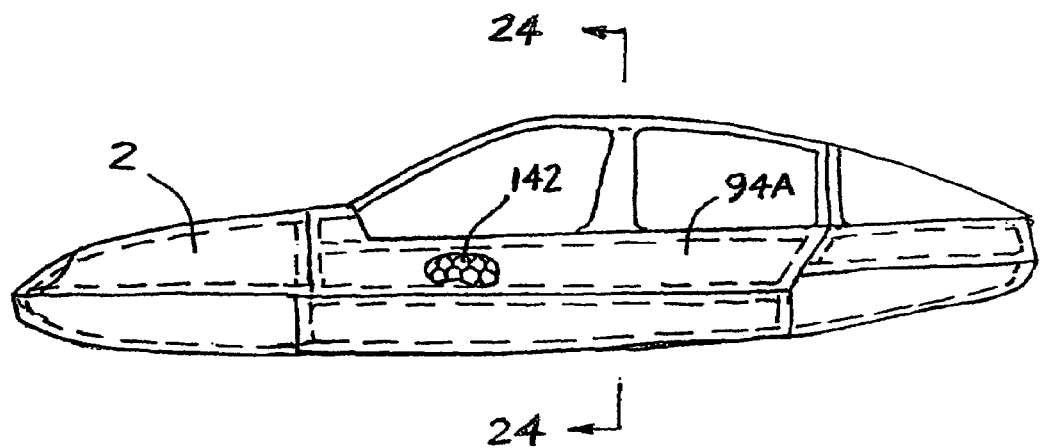
FIG. 23 is a side elevational view of an electric vehicle body, having a composite body shell sandwich filled with a honeycomb core.
Figure 24:
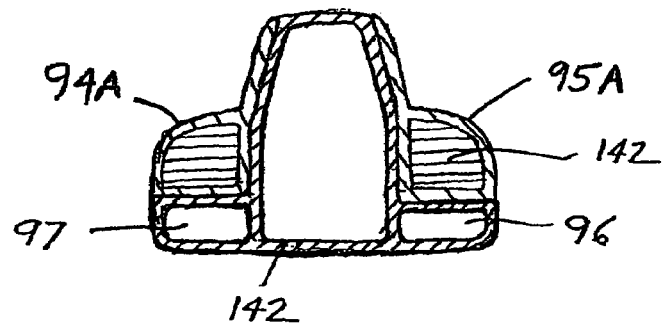
FIG. 24 is a vertical sectional view of an electric vehicle body taken approximately on the line 24—24 of FIG. 23.

Another safety feature built into the vehicle is the tandem seating of the passengers, which permits to have thick side structures above the batteries and said structures may be filled with a honeycomb core or a foam core 142, as shown in FIGS. 23 and 24, and thus absorb substantially an accidental collision impact into the side of the vehicle. This is another embodiment of the invention.

The low corrosion resistance of the magnesium frame 21 may be overcome by protecting it with synergistic fluoropolymer coatings, or anodic oxidation coatings, and an adherence to the design rules recommended for magnesium, such as using electrically insulated hardware and other dissimilar metal parts, and making the maximum possible use of plastic, glass reinforced hardware and eliminating pockets which can hold water.

The magnesium metal is also easily recyclable.

The frame 21 may also be protected by using a fully closed and sealed bottom pan 22 under the vehicle body and by flexible coverings which seal the axles, steering arms and links protruding from the sealed body (not shown). The batteries 14, 15 and 16 should be contained in fully enclosed, sealed tunnels or compartments 24 and 25 made from inert materials and isolated from contact with the frame 21.

Entry and exit from the vehicle may be achieved by lifting top hinged and air spring balanced side doors 23 and 23A, and stepping on the low side battery pack tunnel 24 or 25.

The vehicle may also use gull-wing type doors such as used on Mercedes cars, or standard side doors (not shown), which are features well known in the art.

To achieve minimum torsional loads on the frame 21 or the body 2, which is similar to three wheeled vehicles loads, which results in a lighter frame and/or body, the two rear wheels 5 and 6 may be attached to an arm 26 symmetrically and as close as possible to the center line 13. The arm 26 may be supported by a spring 27 and a shock absorber 28.

Figure 5:
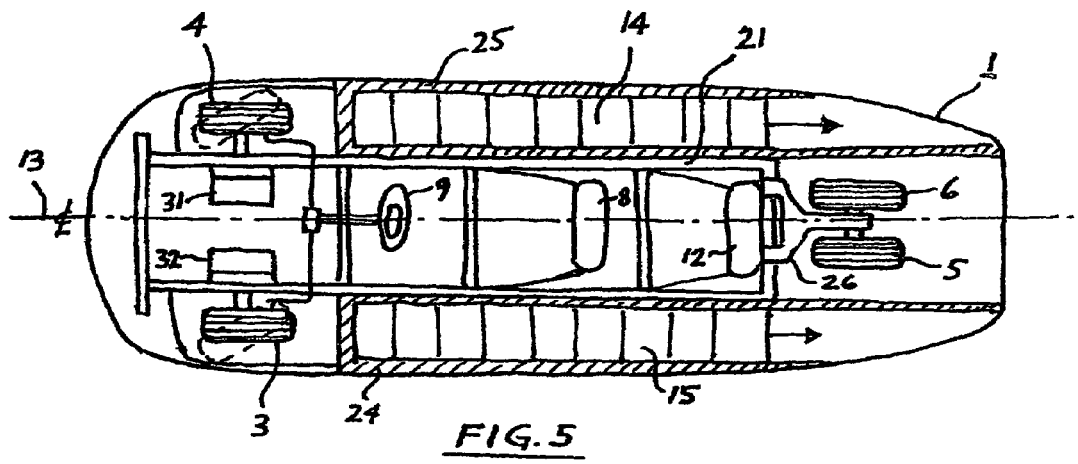
FIG. 5 is a horizontal sectional schematic view taken approximately on the line 5—5 of FIG. 2, illustrating the various components of the vehicle.

Because of the narrowness of the traction width of the rear wheels 5 and 6, it may be possible to remove the side batteries 14 and 15 by sliding them out of the tunnels 24 and 25, to, or through, the rear of the vehicle and miss contact with the rear wheels 5 and 6 as shown in FIG. 5.

The vehicle 1 may also have an electric motor and battery cooling duct openings 29 and a fin 30.

The preferred drive system for the electric vehicle is the front wheel drive system and preferably using two electric motors 31 and 32 with gear reduction boxes connected to the two steered wheels 3 and 4 through axles (not shown) with universal or constant speed joints (not shown).

Figure 6:
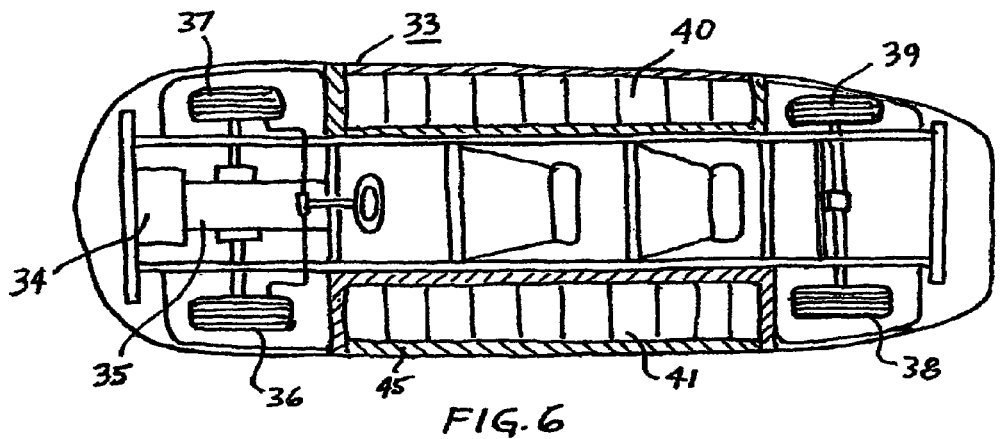
FIG. 6 is a horizontal sectional schematic view taken approximately on the line 6—6 of FIG. 7 of another embodiment of electric vehicle illustrating additional components of the vehicle.
Figure 7:
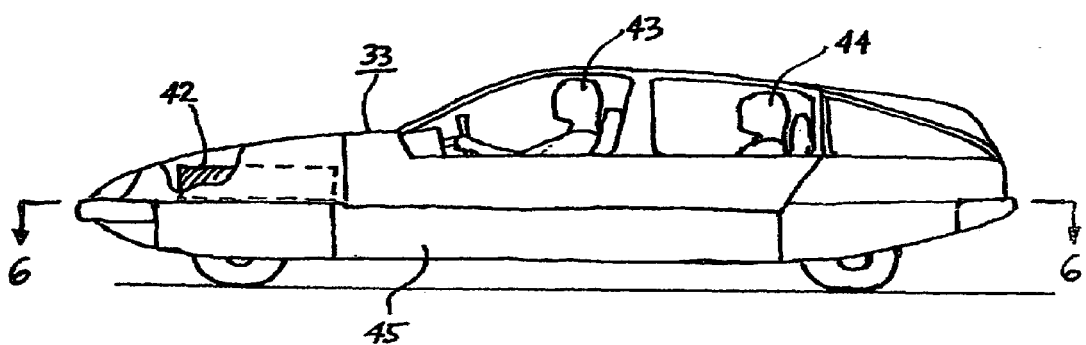
FIG. 7 is a side elevational view of another embodiment of electric vehicle.

Referring additionally to FIGS. 6 and 7, another embodiment of the invention, a four-wheeled electric vehicle 33 is illustrated which may have a single electric motor 34 with a transmission and a differential drive 35 to two front steered wheels 36 and 37. Two rear wheels 38 and 39 are provided which have substantially the same wheelbase width as the front wheels 36 and 37.

The batteries 40, 41 and 42 and the passengers 43 and 44 are located as described above. In this embodiment, however, the batteries 40 and 41 are accessible only through the removable top or side panels 45, due to the traction width of the rear wheels 38 and 39. The other features may be identical to the electric vehicle as described above.

Figure 8:
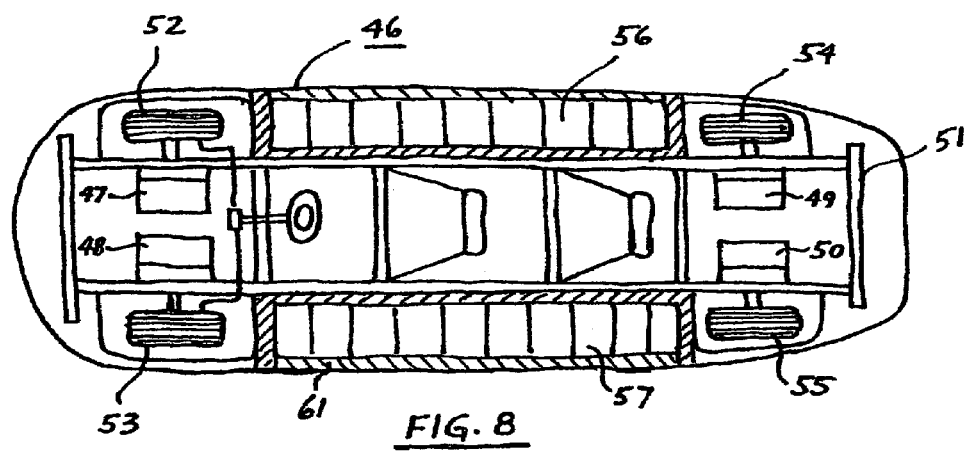
FIG. 8 is a horizontal sectional schematic view of another embodiment of electric vehicle taken approximately on the line 8—8 of FIG. 9, showing the locations of various components of the vehicle.
Figure 9:
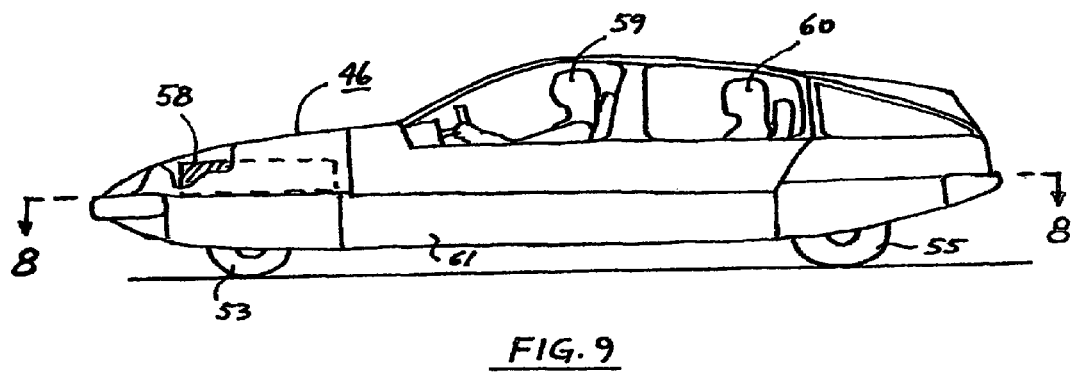
FIG. 9 is a side elevational view of another embodiment of electric vehicle.

Referring to FIGS. 8 and 9, which disclose another embodiment of the invention, another alternate four-wheeled electric vehicle 46 is illustrated which may have four electric motors 47, 48, 49 and 50 attached to the frame 51 and the wheels 52, 53, 54 and 55 resulting in a four wheel independently driven vehicle. The two rear wheel motors 46 and 47 may be disconnected for cruising.

The batteries 56, 57 and 58 and the passengers 59 and 60 are located as described for the previous embodiment of the vehicle 33 and the batteries 56 and 57 may be accessed through removable covers 61, due to the width of the wheel base of the rear wheels 54 and 55.

Figure 10:
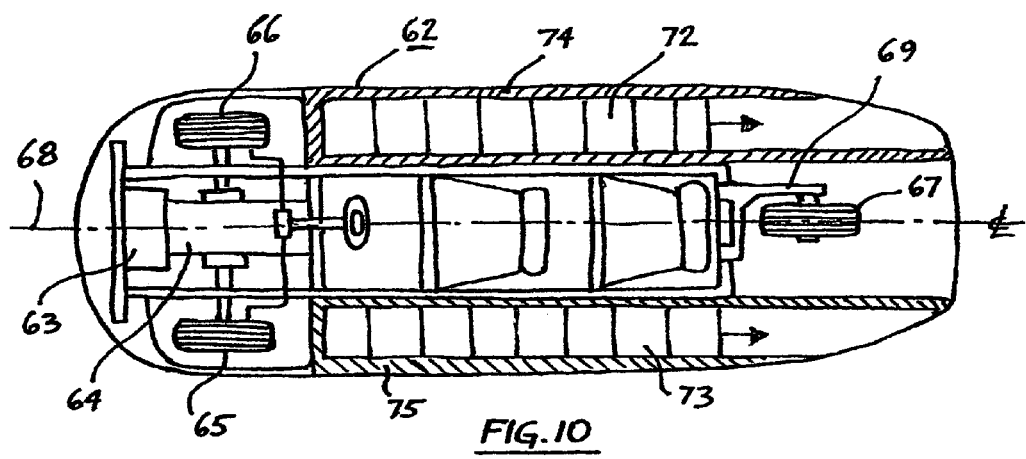
FIG. 10 is a horizontal sectional schematic view of another embodiment of electric vehicle taken approximately on the line 10—10 of FIG. 11.
Figure 11:
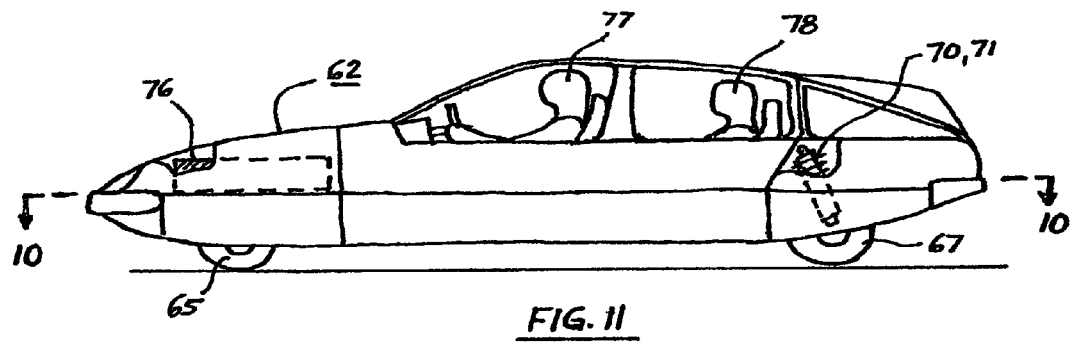
FIG. 11 is a side elevational view of another embodiment of electric vehicle.

Referring now to FIGS. 10 and 11, which disclose another embodiment of the invention, an alternate three-wheeled electric vehicle 62 is illustrated, which may have a single electric motor 63 with a transmission and differential drive 64 connected to two front steered wheels 65 and 66. This embodiment utilizes one rear wheel 67, located on the imaginary center line 68 of the vehicle 62, and may be attached to a pivotable arm 69 which has a spring 70 and a shock absorber 71 attached thereto.

The side batteries 72 and 73 may be removed by sliding them out of the tunnels 74 and 75, to, or through, the rear of the vehicle and which do not contact the rear wheel 67, as shown in FIG. 10.

The batteries 72, 73 and 76 and the passengers 77 and 78 are located as described for the previous vehicle embodiments and other features may be identical as described above.

Figure 12:
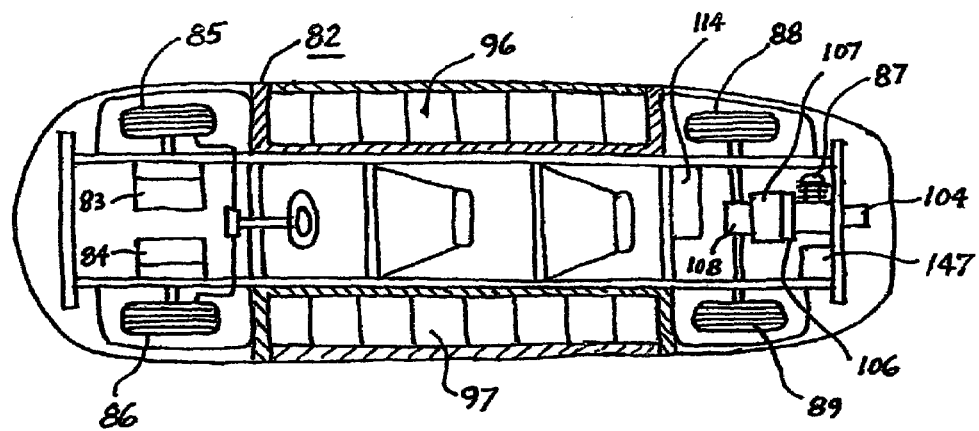
FIG. 12 is a horizontal sectional schematic view of another embodiment of electric vehicle taken approximately on the line 12—12 of FIG. 13.
Figure 13:
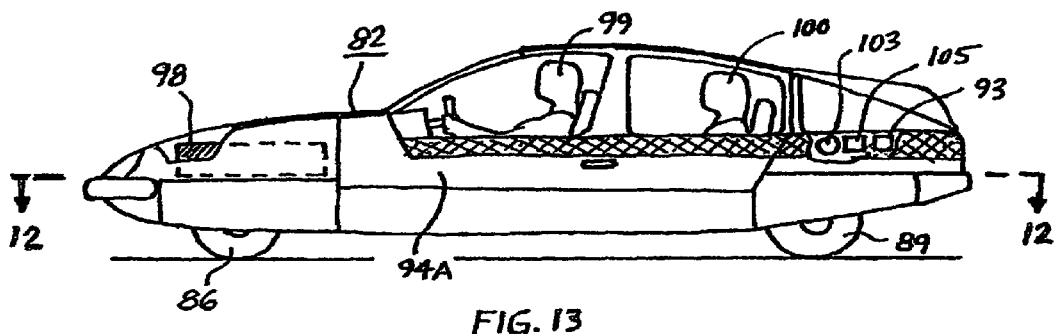
FIG. 13 is a side elevational view of another embodiment of electric vehicle.
Figure 14:
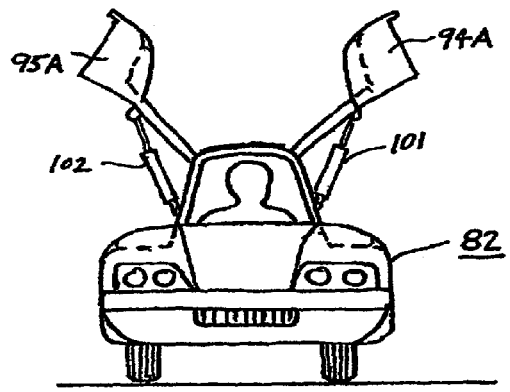
FIG. 14 is a front elevational view of the electric vehicle of the invention shown in FIG. 13.

Referring to FIGS. 12, 13 and 14, another embodiment of four-wheeled electric vehicle 82 is illustrated. The vehicle 82 has two electric motors 83 and 84 driving two front steered wheels 85 and 86.

The electric vehicle of the invention may have at least one optional additional propulsion system such as an open to air internal combustion engine 87, which may have a clutch 106, gear reducer 107, and differential 108 driving the rear wheels 88 and 89, which provides a hybrid electric vehicle.

The engine 87 may be a small auxiliary engine which may be used as a range extender in an emergency, such as in the case of batteries becoming discharged, or in an area where recharging is not available, or it may be used as a power supply for cruising of the vehicle. The batteries then provide the additional power for acceleration or hill climbing. The engine 87 may preferably be, for example, a rotary piston engine which may use non-polluting fuel such as hydrogen contained in the tank 103, which tank may also contain a metal hydride of well known type, or porous carbon, such as carbon graphite, or mesocarbon microbeads, or their mixtures, functioning as absorbent/desorbent of the hydrogen. Example of the metal hydride for hydrogen storage is well known corrosion resistant AB5 type powder, as manufactured by OVONIC Co., Troy, Mich.; an example of the carbon graphite is the graphite powder as manufactured by Superior Graphite Co., Chicago, Ill., and preferably having 300 $m^2$/g surface. Another example of porous carbon may be mesocarbon microbeads as manufactured by Osaka Gas Chemical Co., Osaka, Japan.

The engine 87 may also be used to drive at least one generator 104, which may be an alternator with a rectifier and a voltage regulator, for charging the batteries 96, 97 and 98, and/or powering at least one electric motor, such as motors 83 and 84.

Figure 16A:
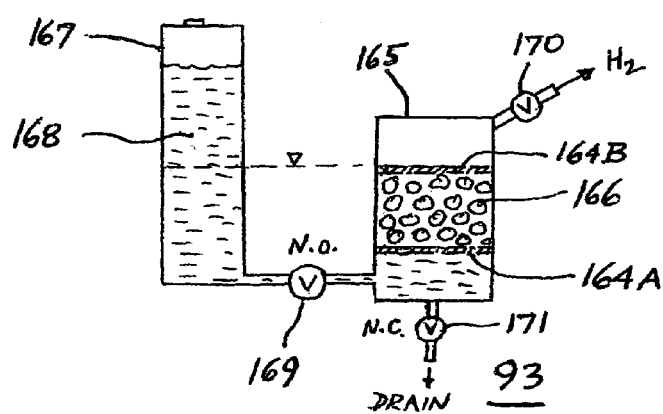
FIG. 16A is a simplified schematic diagram illustrating modified Kipp type reactor system.

Since the use of hydrogen as a fuel requires precautions, it may be produced for safety reasons on demand only, by electrolysis of water, which may be produced by action of the electric current generator 104, and/or the hydrogen may be produced on demand only by other sources, such as a controlled chemical reaction in an optional reactor 93 of well known type, such as a Kipp type reactor generating hydrogen, but which may be using for example reaction of a metal catalyst, such as high surface ruthenium metal catalyst, contacting a non-flammable and stable solution of sodium borohydride in water. As shown in FIG. 16A, the Kipp reactor 93 may be modified by replacing the porous membrane with a screen 164A, replacing the metal hydride in the chamber 165 with the metal catalyst 166 coated on ion exchange resin beads, and replacing the water in the storage tank 167 with the $NaBH_4$ solution in water 168. Screen 164B and control valves 169, 170 and 171 may be added. This reaction produces borax waste material, but the system is safe and has high energy density. This system in combination with the hydrogen-electric hybrid vehicle is another embodiment of the invention.

If electrolysis of water is preferably used, then the hydrogen tank 103 and/or the reactor 93 may be replaced, or assisted by a hydrogen generating cell, or electrolyzer 105 of well known type, which may be electrically connected to the generator 104. Said water may have also an antifreeze agent added. The assisting water contains more hydrogen per kilogram than metal hydride, which makes possible to make the tank 103 smaller, lighter and less costly.

The hydrogen generating cell 105 may be also electrically connected to a battery 109, and/or to the batteries 96, 97 and 98, to start the system operating and also for vehicle acceleration when the demand for fuel is high. The batteries may be recharged by the generator 104 during low power cruising or standing.

Figure 15:
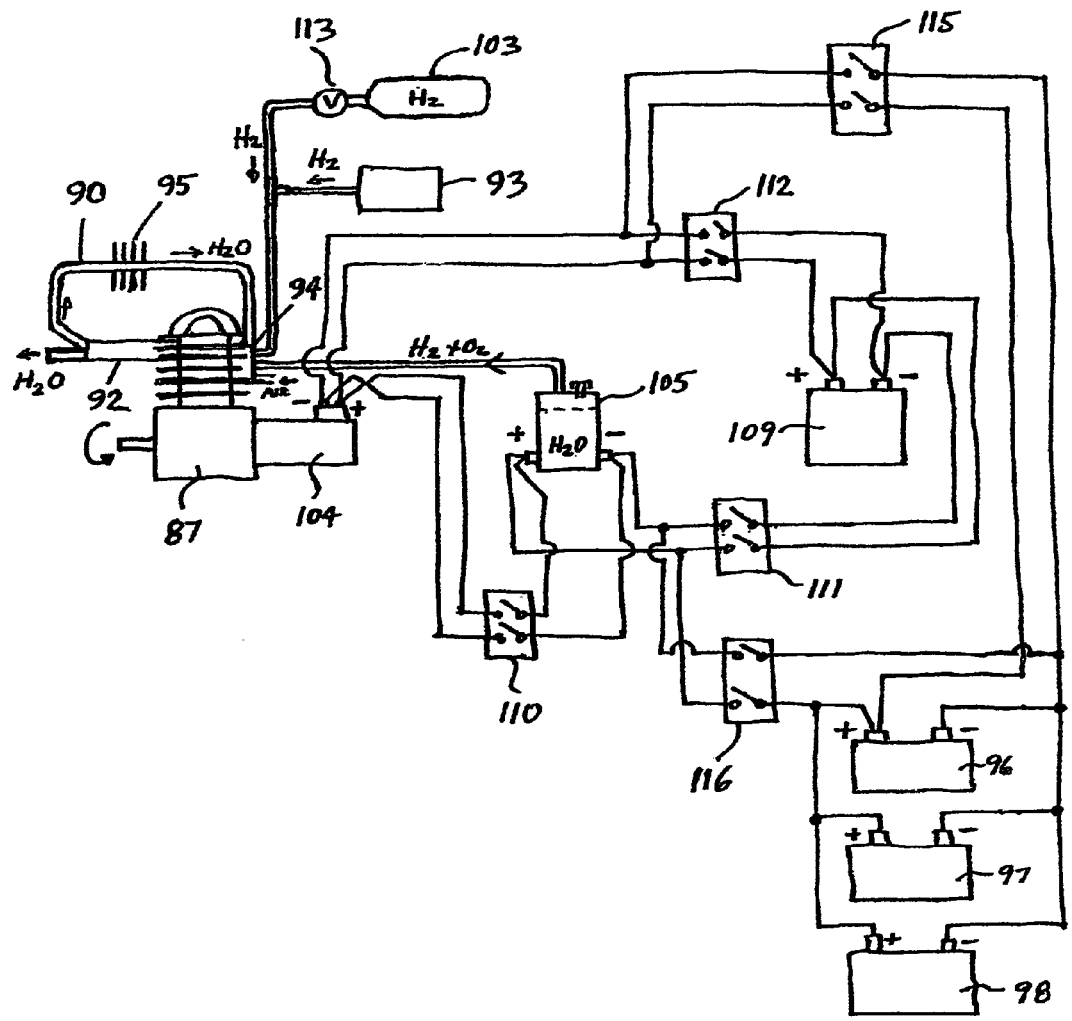
FIG. 15 is a simplified schematic diagram illustrating the principle of the hydrogen fueled optional additional propulsion system.

A simplified schematic illustrating the principles of the system is shown in FIG. 15, which is another embodiment of the invention. Switches or relays 110, 111, 112, 115 and 116 and valve 113 control the system functions as desired.

Referring now to FIG. 15 in more detail, the simplified operation of the system is as follows:

To start the engine 87 running, the switch 111 or switch 116 is turned "ON", which delivers direct electric current from the battery 109 or from batteries 96, 97 and 98 (if they still have some electric energy stored in them), to the hydrogen-oxygen generating cells or electrolyzer 105, which produces hydrogen and oxygen gases and said gases are delivered into the combustion chamber of the engine 87 by suction of the engine pistons where the engine 87 is simultaneously being cranked either manually or by its own cranking battery with a starter (not shown). Because the hydrogen fuel and air, plus oxygen are being delivered into the engine, the engine starts running and also driving the generator 104. When the switch 110 is turned "ON", the direct electric current from the generator 104 is delivered to the cell 105 and adds to, or replaces the current from the batteries 109 or 96, 97 and 98. Then the switches 111 and/or 116 may be turned "OFF", which will disconnect the batteries from the cell 105.

If it is desired that the cell 105 is to be used to assist only to the delivery of the fuel, then the engine 87 may be started as follows:

During cranking of the engine 87, all the switches shown are turned "OFF", but the valve 113 is opened, which delivers stored hydrogen fuel from the tank 103 into the combustion chamber of the engine 87 and the engine starts running and driving the generator 104. When the switch 110 is turned "ON", the electric current is delivered to the cell 105, which starts producing hydrogen and oxygen gases and said gases are delivered into the engine 87, supplementing or replacing the hydrogen fuel from the tank 103. Then the valve 113 may be closed. The batteries 109, 96, 97 and 98 may be also recharged by the generator 104 when the switches 115 and 112 are turned "ON".

All the above described functions can be automated and controlled by an electronic controller (not shown) and all the switches may be replaced by relays.

All the "negative" or all the "positive" wires may be replaced by an electrically conductive frame or chassis.

It should be noted that the optional additional propulsion system may include a reciprocating engine, a turbine or any other suitable engine. All of the above propulsion systems preferably use hydrogen as a fuel.

The reciprocating engine, and especially the engine with pistons and crankshaft may require modifications to run on hydrogen fuel, due to high temperature of hydrogen combustion and a lower ignition point of hydrogen. It has now been found, that part of the exhaust gases, which comprise mostly $H_2O$ steam from at least one exhaust port 92 should be cooled by at least one radiator 95 and returned into at least one intake port 94 by at least one connecting means, such as a pipe 90, to cool the combustion chamber(s) of the engine 87, and that the ignition timing should be delayed. This eliminates the need for injection of extra cooling water into the combustion chamber(s), plus water storage and handling. This water would also freeze in cold weather. Antifreeze agent can not be used because it would pollute the combustion and exhaust.

There is a great advantage in using an electric hybrid fueled by hydrogen, because the engine is approximately one third of the size required for combustion-only driven vehicle. That means, the electric-hybrid has approximately three times longer range per the same amount of hydrogen. Because compressed hydrogen storage is very bulky and heavy and metal hydride storage is heavy, hydrogen powered combustion-only vehicles would have very limited range, similar to electric-only vehicles. The electric-hybrid vehicle configuration fueled by hydrogen makes the "hydro-electric" vehicle of the invention competitive in the range with gasoline fueled, combustion-only vehicles, and is non-polluting. It should be noted that the negligible amounts of $NO_x$ generated can be captured by a well known catalytic converter (not shown).

The hydrogen-electric hybrid vehicle of the invention based on internal combustion engine is also more practical and less costly alternative to expensive fuel cell vehicles. The described hydrogen-electric vehicle may have range 300–400 miles.

Entry into the vehicle 82 by both passengers may be achieved through at least one large side door, and the door or doors 94A and 95A may be hinged at the roof of the vehicle and supported by air springs 101 and 102, as shown in FIG. 14.

The batteries 96, 97 and 98 and the passengers 99 and 100 are located as described for the previous embodiment of the vehicle 33. The other features of the vehicle 82 may be identical to those as shown for the electric vehicles 33 or 1 or 46 or 62 as described above, but in the vehicles 1, 46 and 62, the clutch 106, gear reducer 107 and differential 108 may be omitted.

Another embodiment of the invention is the hydrogen-electric hybrid propulsion system which includes safe and lightweight storage of hydrogen and an optional system for fast replenishment of hydrogen from existing infrastructure, and which may be for example also included into modified vehicle 82.

Figure 25:
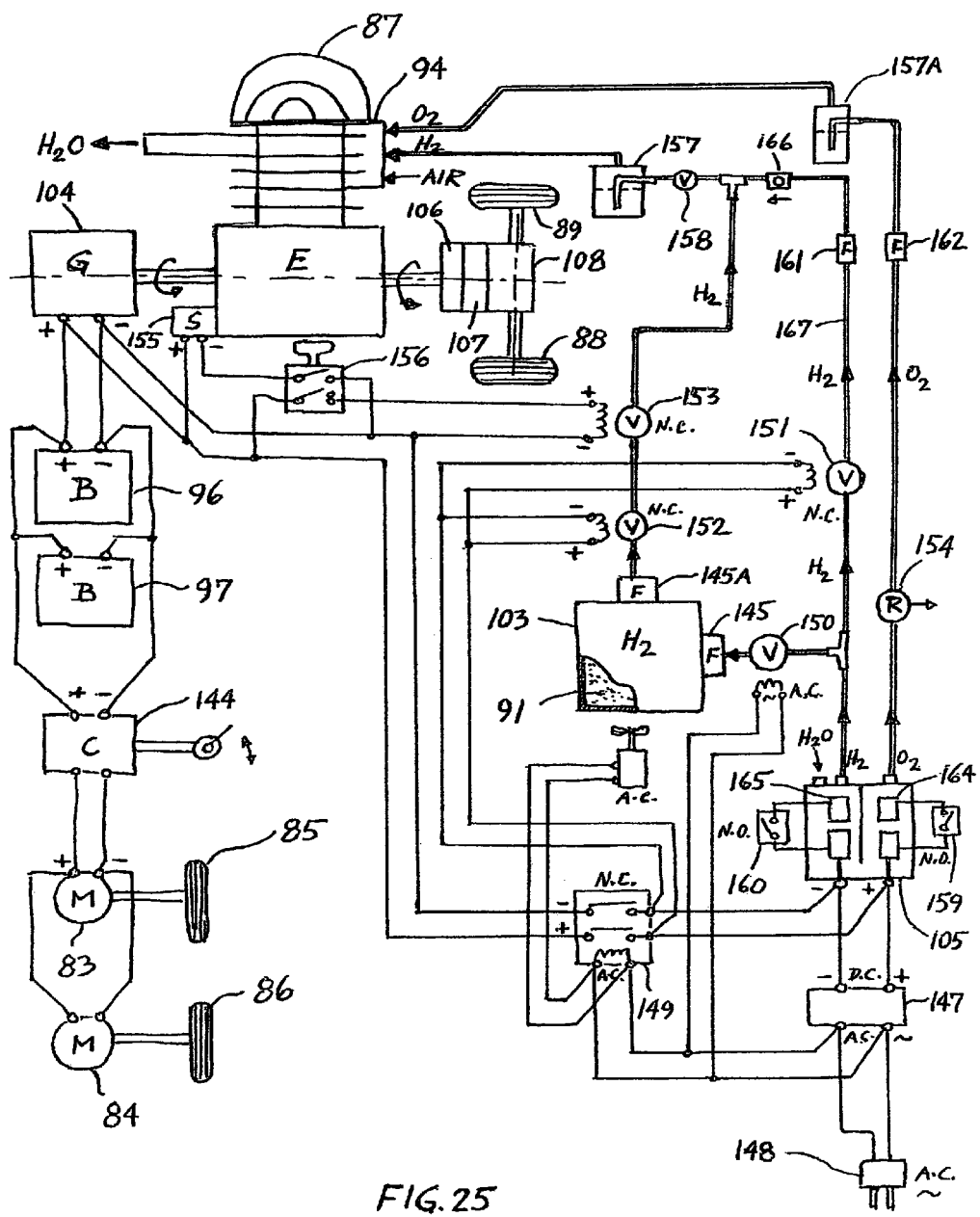
FIG. 25 is a simplified schematic diagram illustrating the principle of the hydrogen-electric hybrid propulsion system with lightweight hydrogen storage and optional quick refueling system from existing infrastructure.

Referring now to FIG. 25 which is a simplified schematic of the system, the system comprises: at least one combustion engine 87 with at least one generator 104, at least one battery or batteries 96 and 97, at least one motor controller 144, at least one electric motor or motors 83 and 85 driving the wheels 85 and 86. The engine 87 is fueled by hydrogen from a low positive pressure storage tank 103 which may in this case contain porous carbon graphite 91 as an absorbent of the hydrogen, and has a filter 145 at the refueling orifice, which filter prevents moisture and/or oxygen from entering the tank 103. The engine 87 may have also a clutch 106, which connects it to the wheels 88 and 89.

The system may also additionally include at least one electrolyzer 105, at least one D.C. or direct current power supply 147, with A.C. or alternating current plug 148, relay 149, solenoid valves 150, 151, 152, and 153, a pressure regulator 154, starter 155, key switch 156, one way check valves 157 and 157A, flow regulator 158, relays 159 and 160, filters 161 and 162, and fan 163.

Simplified functions of the described components are as follows:

The engine 87 drives the generator 104, which generates direct current to charge the batteries 96 and 97 and/or to power the electric motors 83 and 84 through variable speed controller 144. The generator 104 may be also an alternator with a rectifier and voltage regulator. The engine 87 may have also a clutch 106 and reduction drive 108 through which the wheels 88 and 89 may be driven.

Now, the engine 87 is fueled by hydrogen from the tank 103 by creating a negative pressure at its intake 94, and the flow is controlled by the flow valve 158. Hydrogen may be also released (desorbed) from the graphite by heating the graphite with a heat exchange from the engine 87, or by an electric heater (not shown). The one-way check valves 157 and 157A, which may be bublers, prevent backfire of the engine into the tank 103 and into the cell 105. Another one-way check valve 166 prevents hydrogen flow from the tank 103 into the cell 105. First, however, the engine is started by the starter 155, activated by the (key) switch 156.

The same switch 156 also opens the solenoid valve 153 and keeps it open if engine starts. Then the generator 104 or batteries 96 and 97 supply power through normally closed relay 149 to the solenoid valves 152 and 153 and opens them. The generator 104 also supplies electric power through the relay 149 to the electrolyzer 105, which contains water mixed with a salt (such as KOH or baking soda) and produces hydrogen and oxygen by electrolysis of the water. The salt also prevents freezing of the water. Said hydrogen from the electrolyzer 105 supplements the hydrogen from the tank 103, so the tank 103 does not have to be big and heavy. The oxygen may be supplied also into the engine 87 or may be vented through the regulator valve 154 into the atmosphere. Regulator 154 is needed to maintain equilibrium in the cell or electrolyzer 105. Because hydrogen is not readily available everywhere like gasoline, another embodiment of this invention is an optional quick refueling of the hydrogen tank from the existing infrastructure, as follows:

When hydrogen in the tank 103 is depleted, it may be replenished by filling the electrolyzer 105 with water (and preferably deionized or distilled water) and by plugging the plug 148 into an outside A.C. socket, matching the voltage required for D.C. power supply 147, or connecting the power supply 147 to an outside A.C. by other well known means. The power supply 147 may be just a rectifier and preferably high current rectifier converting A.C. current into D.C. or it may be a rectifier with transformer or other step down device. The A.C. plug 148 cable also powers the coil of relay 149 which opens and disconnects electrically the generator 104, or batteries 96 and 97 from the electrolyzer 105. The relays 159 and 160 are also put into "ON" position to connect additional surfaces of the electrodes 164 and 165 to make them proportional to the higher current. High current from the A.C. socket outside source produces hydrogen in the electrolyzer very fast and said hydrogen flows through connecting means, such as tube 167 into the tank 103 and is absorbed immediately into the porous carbon graphite 91, accordingly as is described in my prior U.S. Pat. No. 5,712,054/which is herein incorporated by reference. (The full absorption may be possible within ten minutes). Tank 103 is cooled during this step by an A.C. fan 157. When the plug 148 is connected to an outside A.C. current source, it also opens the solenoid valve 150 and relay 149, which closes the valves 151 and 152 to prevent oxygen from air to enter the tank 103. Also the filter 145A stops oxygen and/or moisture from entering the tank 103.

The filters 161 and 162 and the bublers 157 and 157A filled with antifreeze liquids prevent any chemical fumes (like $KOH+H_2O$) from entering the engine 87.

The tank 103 and the cell 105 each may also have at least one well known safety pressure relief valve (not shown) and at least one well known safety pressure switch (not shown), disconnecting the electric current from the generator 104 and/or power supply 147 to the cell 105, to prevent overfilling of the tank 103.

The D.C. power supply or charger 147 may be also used for fast and direct charging of batteries (like 96 and 97) if necessary, through a well known selector switch (not shown). For production of hydrogen at a station, and for example a home station, the D.C. power supply 147 may be also replaced or by-passed by a non-polluting D.C. power source, like solar cell charger or wind turbine charger (not shown), or the hydrogen may be produced on demand only by other means, such as the reactor system with sodium borohydride solution in water and a metal catalyst (not shown), or other chemical reactors. In this case, the hydrogen may be fed directly into the storage tank 103 (not shown).

It should be noted that the preferred storage tank design and the system with the electrolyzer is described in more detail in my prior Disclosure Document Ser. No. 452,940, which is herein incorporated by reference.

The graphite in this hydrogen storage system may be also replaced by a metal hydride or mesocarbon microbeads, or mixtures of carbon graphite and mesocarbon microbeads, or mixtures of metal hydride, carbon graphite and mesocarbon microbeads, or other storage medium, but the carbon graphite is preferred because it has now been found that the graphite has at least five times larger specific storage capacity of hydrogen (liters of hydrogen per gram) than the metal hydride. Useful range of each of these materials is from trace amounts to 99% (percent) by weight. The described hydrogen-electric hybrid vehicle with lightweight graphite storage of hydrogen thus may have range of 900 to 1000 miles or more. The graphite or mesocarbon also does not corrode, which provides a long cycle life of the storage system.

Another advantage of the above described preferred vehicle construction is that it produces no waste material to be disposed of, and is environmentally friendly, without $CO_2$, carbon or other pollutants.

The above described chemical absorbent/desorbent systems provide low pressure, which is also much safer. The low pressure is meant to be approximately 40 to 250 PSI, and preferably 120 PSI.

Thus it can be seen from the disclosed description of the invention, that the long range, non-polluting and safe vehicle which can be refueled safely and practically anywhere has been achieved.

It is obvious to a person skilled in the art, that the described hydrogen generating, refueling and storing, and the additional power generating system is useable also in many other electric and/or electric hybrid vehicles, including two wheeled and/or single passenger vehicles, or such vehicles as described in my prior patent application Ser. No. 08/950,445, which is herein incorporated by reference.

It is also apparent to a person skilled in the art from the described embodiments of the electric vehicle of the invention, that it is possible to combine and alternate differently and variously many of the features shown, especially various drive systems with various configurations of the wheels without departing from the spirit of the invention.

Figures 21, 22:
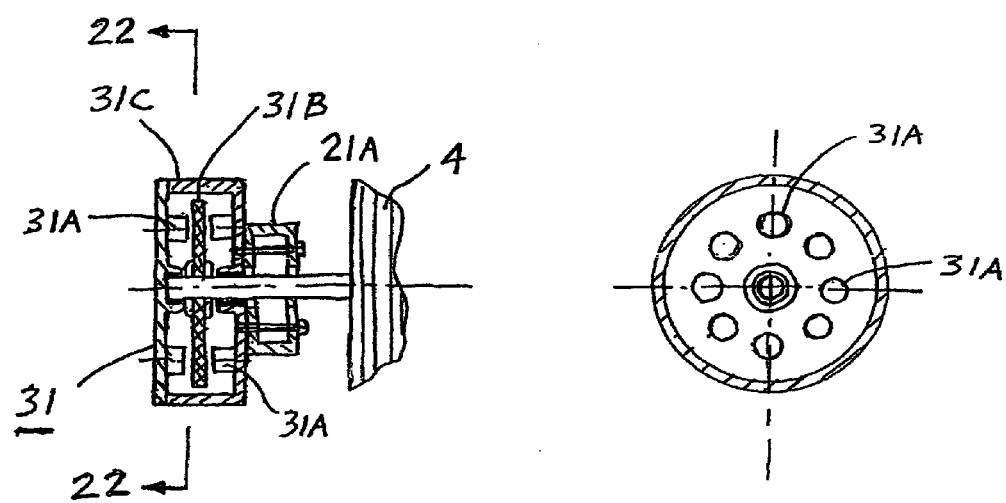
FIG. 21 is a vertical sectional view of an electric motor having a printed circuit board disc armature.
FIG. 22 is a vertical sectional view of an electric motor taken approximately on the line 22—22 of FIG. 21.

While any suitable type of electric motor is useable, the preferred electric motor or motors for the vehicles of the invention are the disc armature type, and more preferably the printed circuit board, disc armature design type motors, as manufactured by PMI Motion Technologies, Division of Kollmorgen Corporation, Commack, N.Y., U.S.A., and as shown in FIG. 21 and FIG. 22, which are another embodiments of the invention. These motors may have neodymium iron boron magnets (Nd Fe B) 31A, as manufactured by SPS Technologies, Newtown, Pa., U.S.A., and a disc armature 31B, and may have also magnesium casings 31C. The disc armature motor can deliver much higher torque per given weight than other electric motors, due to its large diameter, which is very desirable in electric vehicles.

Although the electric vehicles of the invention may use almost any type of rechargeable battery, the preferred batteries are lithium rechargeable batteries and more preferably, lithium-ion-polymer rechargeable batteries, or hydrogen rechargeable batteries, such as described in my U.S. Pat. No. 5,712,054.

The vehicles of the invention may also use a well known electricity generating fuel cell system for its propulsion, which may replace at least one battery or all the batteries and/or the engine/generator generally, or in the described locations, or it may be an additional fuel cell system 114 to assist or charge the batteries, or to support other systems, as shown in FIG. 12.

It is apparent that the above described graphite or the mixed graphite with a metal hydride and/or mesocarbon microbeads as absorbent/desorbent of the hydrogen, and/or said quick refueling system can be used also to provide, store and supply hydrogen fuel for these fuel cell systems, and that it may be also used in many other fuel cell powered vehicles. The fuel cells may also power at least one motor, such as described motors 83 and 84. The preferred fuel cell system for the vehicles of the invention are the hydrogen/oxygen type, the hydrogen/air type and/or their combinations.

The preferred tires for the electric vehicles of the invention are lightweight, pressure-airless tires with honeycomb core as described in my prior U.S. Pat. No. 5,494,090 and U.S. Pat. No. 5,685,926. These tires are safer because they are puncture-proof and damage resistant and they also have low rolling resistance and thus further reduce the drag on the vehicle.

The heating and/or cooling system of the passengers enclosure may be of any well-known type, but it should preferably be fueled by hydrogen to protect the environment, and more preferably, by hydrogen produced on demand only by electrolysis of water in the vehicle or by other means. Cooling and heating system may also be powered by the combustion engine 87, fueled by hydrogen.

Referring now to FIGS. 23 and 24, which are another embodiment of the invention, the described vehicle body may be also built by a self-supportive sheet metal or composite shell 141, but made of a resin and the ultrahigh molecular weight polyethylene fibers and/or of a honeycomb or a foam sandwich 142, as described above, or may be constructed of other materials as described in the prior art, but the preferred described configuration and the location of the driver, the rear passenger or passengers, and the batteries or the fuel cell systems, as well as the preferred body shape and the preferred propulsion systems as described should be maintained, to achieve the most advantages of the invention.

It should, of course, be understood that the description and the drawings herein are merely illustrative and it will be apparent that various modifications, combinations and changes can be made of the structures and the systems disclosed without departing from the spirit of the invention and from the scope of the appended claims.

It will thus be seen that the non-polluting, economical, long range and safer electric hybrid vehicle construction, which can be energized anywhere has been provided, with which the objects of the invention are achieved.

I claim:

1. Electric vehicle construction which includes a body for carrying at least one passenger and an electric propulsion system with at least one electric motor, at least one battery, at least one electricity generating fuel cell system for charging said battery and/or powering said motor, and a hydrogen storage system attached to said body, and which body rides on at least two wheels with a steering system attached to said body, the improvements wherein said hydrogen storage system contains a mixture of carbon graphite, mesocarbon microbreads and metal hydride as a storage medium and absorbent/desorbent.

2. Electric vehicle construction which includes a body for carrying at least one passenger and an electric propulsion system with at least one electric motor, at least one electricity generating fuel cell system for powering said motor, and hydrogen storage system attached to said body, and which body rides on at least two wheels with a steering system attached to said body, the improvement wherein said hydrogen storage system contains a mixture of carbon graphite, mesocarbon microbeads and metal hydride as a storage medium and absorbent/desorbent.

3. Electric vehicle construction which includes a body for carrying at least one passenger and an electric propulsion system with at least one electric motor, at least one batty, at least one electric current generator for charging said battery and/or powering said electric motor, and which generator is driven by at least one internal combustion engine, and a hydrogen storage system having hydrogen therein, attached to said body, and which body rides on at least two wheels with a steering system attached to said body, the improvement wherein said engine is an open to air combustion engine and is fueled only by said hydrogen, and wherein said hydrogen storage system contains a mixture of carbon graphite, mesocarbon microbeads and meal hydride as a storage medium and absorbent/desorbent.

4. Electric vehicle construction as described in claims 1, or 2, or 3, which additionally includes at least one hydrogen generating electrolyzer having hydrogen therein, attached to said body, and said electrolyzer is also electrically connectable to an electric power source outside of the vehicle, and the hydrogen is stored in said hydrogen storage system at low pressure.

5. Electric vehicle construction as described in claims 1, or 2, wherein said hydrogen storage system includes at least one hydrogen generating reactor, which reactor produces hydrogen by reaction of a metal catalyst in contact with a solution of sodium borohydride in water.

6. Electric vehicle construction which includes a body for carrying at least one passenger and an electric propulsion system with at least one electric motor, at least one battery, at least one electric current generator for charging said battery and/or powering said electric motor, and which generator is driven by at least one internal combustion engine, a hydrogen storage system having hydrogen therein, and having a hydrogen generating cell which generates hydrogen by electrolysis of water, attached to said body, and which body rides on at least two wheels with a steering system attached to said body, the improvement wherein said engine is an open to air combustion engine and is fueled only by the hydrogen, the hydrogen being supplied from said storage system and from said hydrogen generating cell, said cell is electrically connected to said generator, and said cell is also electrically connected to said battery, and wherein said hydrogen storage system contains a mixture of carbon graphite, mesocarbon microbeads and metal hydride as a storage medium and absorbent/desorbent.

7. Electric vehicle construction which includes a body for carrying at least one passenger and an electric propulsion system with at least one electric motor, at least one battery, at least one electric current generator for charging said battery and/or powering said electric motor, and which generator is driven by at least one internal combustion engine, and a hydrogen storage system having hydrogen therein, attached to said body, and which body rides on at least two wheels with a steering system attached to said body, the improvement wherein said engine is an open to air combustion engine and is fueled only by said hydrogen, and in which said internal combustion engine includes at least one intake port and at least one exhaust port and at least one cooled partial return of exhaust gases including water from said exhaust port into said intake port through connecting means, and which means include a radiator.

8. Electric vehicle construction which includes a body for carrying at least one passenger and an electric propulsion system with at least one electric motor, at least one battery, at least one electric current generator for charging said batty, and/or powering said electric motor, and which generator is driven by at least one internal combustion engine, and a hydrogen generating cell having hydrogen therein, attached to said body, and which body rides on at least two wheels with a steering system attached to said body, the improvement wherein said is an open to air combustion engine and is fueled only by hydrogen which is produced by electrolysis of water in said hydrogen generating cell, said cell is electrically to said generator and also to said battery, the hydrogen is not stored under pressure and is immediately consumed by said engine, and in which said internal combustion engine includes at least one intake port and at least one exhaust port and at least one cooled partial return of exhaust gases including water from said exhaust port into said intake port through connecting means, and which means by-pass said hydrogen generating cell.

9. Electric vehicle construction which includes a body for carrying at least one passenger and electric propulsion system with at least one electric motor, at least one battery, at least one electric current generator for charging said battery and/or powering said electric motor, and which generator is driven by at least one internal combustion engine, a hydrogen storage system having hydrogen therein, and having a hydrogen generation cell which generates hydrogen by electrolysis of water, attached to said body, and which body rides on at least two wheels with a steering system attached to said body, the improvement wherein said engine is an open to air combustion engine and is fueled only by the hydrogen, the hydrogen being supplied from said storage system and from said hydrogen generating cell, said cell is electrically connected to said generator, and said cell is also electrically connected to said battery, and in which said internal combustion engine includes at least one intake port and at least on exhaust port and at least one cooled partial return of exhaust gases including water from said exhaust port into said intake port through connecting means, and which means by-pass said hydrogen generating cell.

10. Electric vehicle construction which includes a body for carrying at least one passenger and electric propulsion system with at least one electric motor, at least one battery, at least one electric current generator for charging said battery and/or powering said electric motor, and which generator is driven by at least one internal combustion engine, a hydrogen storage system having hydrogen therein, and having a hydrogen generating cell which generates hydrogen by electrolysis of water, attached to said body, and which body rides on at least two wheels with a steering system attached to said body, the improvement wherein said engine is an open to air combustion engine and is fueled only by the hydrogen, the hydrogen being supplied from said storage system and from said hydrogen generating cell, said cell is electrically connected to said generator, and said cell is also electrically connected to said batter, and in which said hydrogen generating cell having hydrogen therein is also electrically connectable to an electric power source outside of the vehicle, and the hydrogen is stored in said hydrogen storage system at low pressure, and said hydrogen storage system contains an absorbent/desorbent.

* * * * *